United States Patent
Ahn et al.

(10) Patent No.: US 10,521,849 B2
(45) Date of Patent: Dec. 31, 2019

(54) USER TERMINAL FOR PROVIDING IN-APP SERVICE AND IN-APP SERVICE SERVER

(75) Inventors: Heejung Ahn, Yongin-si (KR); Suerynn Roh, Seoul (KR); Jihong Lee, Seoul (KR); Hyuckjin Im, Seongnam-si (KR); Jaeseok Jang, Seoul (KR)

(73) Assignee: KT Corporation, Seongnam-si (KR)

( * ) Notice: Subject to any disclaimer, the term of this patent is extended or adjusted under 35 U.S.C. 154(b) by 1160 days.

(21) Appl. No.: 14/126,603

(22) PCT Filed: Jul. 13, 2011

(86) PCT No.: PCT/KR2011/005137
§ 371 (c)(1),
(2), (4) Date: Dec. 16, 2013

(87) PCT Pub. No.: WO2012/173301
PCT Pub. Date: Dec. 20, 2012

(65) Prior Publication Data
US 2014/0114801 A1    Apr. 24, 2014

(30) Foreign Application Priority Data

Jun. 15, 2011 (KR) .................. 10-2011-0058095

(51) Int. Cl.
G06Q 30/06    (2012.01)
G06Q 30/00    (2012.01)
G06Q 50/00    (2012.01)

(52) U.S. Cl.
CPC ......... *G06Q 30/0633* (2013.01); *G06Q 30/00* (2013.01); *G06Q 50/00* (2013.01)

(58) Field of Classification Search
CPC ............................ G06F 3/0482; G06Q 20/123; G06Q 30/0633; G06Q 30/00; G06Q 50/00

(Continued)

(56) References Cited

U.S. PATENT DOCUMENTS

2004/0128145 A1    7/2004  Sato
2006/0217111 A1*   9/2006  Marolia ................... G06F 8/65
                                                         455/418

(Continued)

FOREIGN PATENT DOCUMENTS

KR    10-2002-0077987 A    10/2002
KR    10-0614560 B1          8/2006

(Continued)

OTHER PUBLICATIONS

Anonymous, Miramar Enters the Digital Revolution with the Release of its New PC MACLAN Upgrade; PC MACLAN for 95/98/Me is Apple OS X.1 Compatible, Dec. 13, 2001, Business Wire, pp. 1-2. (Year: 2001).*

(Continued)

*Primary Examiner* — Jason B Dunham
*Assistant Examiner* — Brittany E Bargeon
(74) *Attorney, Agent, or Firm* — Sughrue Mion, PLLC

(57) ABSTRACT

A user terminal providing an in-app service and an in-app service server are provided. The user terminal includes an in-app module configured to be connected to the in-app service server and configured to transmit a multimedia content purchase request, a present request, and a share request to the in-app service server, and a terminal agent installed in an operating system of the user terminal, automatically driven when the user terminal is booted, and operating as a user interface for requesting the in-app service. The in-app service server includes an in-app module interworking unit configured to interwork with an in-app module of a user terminal, and a service controller configured to implement the in-app service when the in-app service is requested.

23 Claims, 11 Drawing Sheets

(58) Field of Classification Search
USPC .......................................................... 705/26.8
See application file for complete search history.

(56) References Cited

U.S. PATENT DOCUMENTS

| | | | | |
|---|---|---|---|---|
| 2007/0264982 | A1* | 11/2007 | Nguyen | H04M 1/72552 455/414.1 |
| 2007/0299737 | A1* | 12/2007 | Plastina | G06Q 30/0207 705/14.1 |
| 2008/0320139 | A1* | 12/2008 | Fukuda | G06Q 30/02 709/226 |
| 2009/0163183 | A1* | 6/2009 | O'Donoghue | G06Q 30/02 455/414.1 |
| 2010/0235889 | A1* | 9/2010 | Chu | G06F 21/121 726/4 |
| 2012/0079606 | A1* | 3/2012 | Evans | G06F 21/10 726/28 |
| 2014/0143087 | A1* | 5/2014 | Ahn | G06Q 30/0282 705/26.7 |

FOREIGN PATENT DOCUMENTS

| | | |
|---|---|---|
| KR | 10-0617858 B1 | 8/2006 |
| KR | 10-2010-0011807 A | 2/2010 |
| KR | 10-2010-0070653 A | 6/2010 |
| KR | 10-2011-0009587 A | 1/2011 |
| KR | 10-2011-0042469 A | 4/2011 |

OTHER PUBLICATIONS

International Search Report for PCT/KR2011/005137 dated May 17, 2012.
Downloads of 'Picture Books' App for iPad by Dahami Communications surpassed 12,000:, Dec. 16, 2010, The Korea Economics Daily, www.hankyung.com/news/app/newview.php?type=2&aid=2010121606647&nid=910&sid=0104.
"iPhone paid model, in App Purchase", Jan. 14, 2010, Daily Interests, Deepnite.tistory/entry/iPhone-paid-model-In-App-Purchase.

* cited by examiner

USER TERMINAL FOR PROVIDING IN-APP SERVICE AND IN-APP SERVICE SERVER

CROSS-REFERENCE TO RELATED APPLICATIONS

This application is a National Stage application under of International Application No. PCT/KR2011/005137, filed on Jul. 13, 2011, which claims priority from Republic of Korea Patent Application No. 10-2011-0058095 filed on Jun. 15, 2011, the disclosures of which are incorporated herein by reference in their entirety.

BACKGROUND

Field

Apparatuses consistent with exemplary embodiments relate to a user terminal for providing an in-app service, and an in-app service server.

Description of the Related Art

Smartphones that have been actively developed and released provide various applications. Also, various multimedia content and applications may be purchased through online markets such as an app store.

However, in the related art, when a user finds interested multimedia content while watching a TV or while Web surfing, the user needs to directly connect to an online market, search the multimedia content, and subsequently purchase the multimedia content, causing inconvenience.

Also, the user may download the purchased content to his or her phone, but a function allowing for the user to present content to a different user, in particular, a friend, or to download content to another of his or her terminals is not provided.

Further, a function allowing the user to share multimedia content with a different user while executing the multimedia content has not yet been proposed.

The above information disclosed in this Background section is only for enhancement of understanding of the background of related art and therefore it may contain information that does not form the prior art that is already known in this country to a person of ordinary skill in the art.

SUMMARY

Exemplary embodiments provide a user terminal providing an in-app service and an in-app service server that allow for multimedia content transactions without having to access to an online market and provide an interface environment allowing for communication between terminals.

An exemplary embodiment provides a user terminal providing an in-app service. The user terminal includes: an in-app module configured to be connected to an in-app service server providing an in-app service, which allows for at least one from among purchasing multimedia content, sharing multimedia content between different users, and presenting multimedia content between different users without having to access an online market via a network, and configured to transmit a multimedia content purchase request, a present request, and a share request to the in-app service server; and a terminal agent of the user terminal, the terminal agent operating as a user interface for requesting the in-app service.

Another exemplary embodiment provides an in-app service server providing an in-app service. The in-app service server, which is connected to a plurality of user terminals, includes: an in-app module interworking unit connected to an in-app module for an in-app service, the in-app service being previously installed in at least one of the plurality of user terminals to transmit and receive data for the in-app service, the in-app service being a service allowing the at least one of the plurality of user terminals to purchase, share, and present multimedia content without having to access an online market; and a service controller configured to implement the in-app service when the in-app service is requested by the at least one of the plurality of user terminals through the in-app module interworking unit.

According to an exemplary embodiment, since an in-app service is implemented in the form of a component and inserted in a plurality of unspecified applications, a customized recommended service can be easily provided in any environment. Also, user terminals including an in-app module installed therein may perform communication.

BRIEF DESCRIPTIONS OF THE DRAWINGS

DETAILED DESCRIPTION

Figure 1:
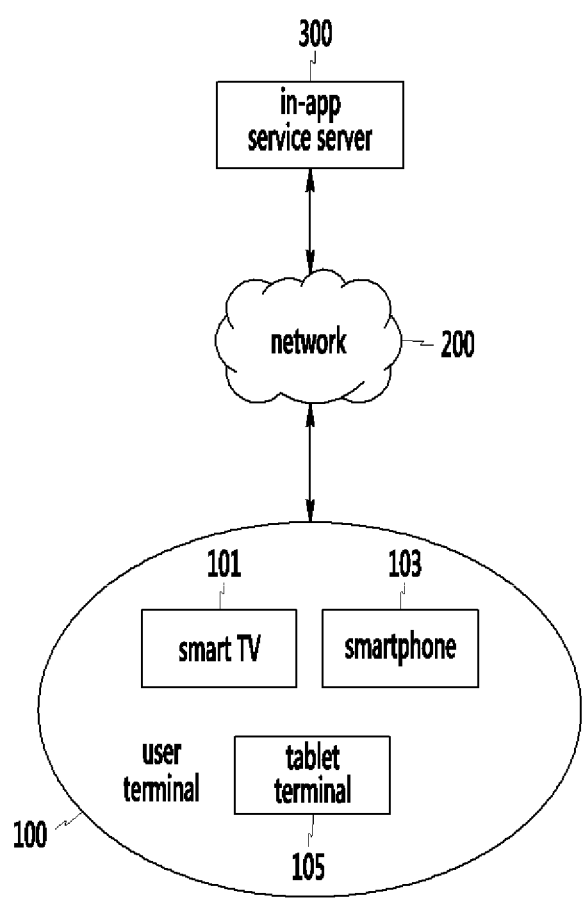
FIG. 1 is a view illustrating a configuration of an in-app service system according to an exemplary embodiment.

In the following detailed description, only certain exemplary embodiments have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In addition, the terms such as "-er", "-or", and "module" described in the specification denote units for processing at least one function and operation, and can be implemented by hardware components or software components and combinations thereof.

Hereinafter, a user terminal for providing an in-app service and an in-app service server according to an exemplary embodiment will be described in detail.

First, in-app refers to an application providing a common service in a form in which a component is inserted in a plurality of unspecified applications.

Here, an application may be a web application accessed by a uniform resource locator (URL) of a web page and executed on the web, or may be a native application downloaded to a terminal and executed in the terminal.

FIG. 1 is a view illustrating a configuration of an in-app service system according to an exemplary embodiment.

Referring to FIG. 1, the in-app service system includes a user terminal 100 and an in-app service server 300 connected to the user terminal 100 via a network 200.

Here, the in-app service is defined as a service providing an interface environment in which the user terminal 100 may deal with multimedia content without having to access an online market system (not shown), and communication between terminals having an in-app module installed therein is available.

An online market system (not shown) may designate, for example, Appstore, Korean integrated Appstore (K-WAC), and the like.

Also, multimedia content refer to a combined form of multimedia components such as text, image, sound, video, animation, and the like, and control elements defining a behavior or interaction of each component.

Meanwhile, the user terminal 100 includes any terminal that may access the network 200 to transmit and receive data and store and execute multimedia content. The user terminal 100 may be, for example, a smart TV 101, a smartphone 103, or a tablet terminal 105. The smart TV 101 refers to a TV in which various applications produced by third-party enterprises or developers are installed and which may be able to transmit and receive data via the network 200. The tablet terminal 105 may designate, for example, an iPad, a Galaxy Tab, and the like.

Figure 2:
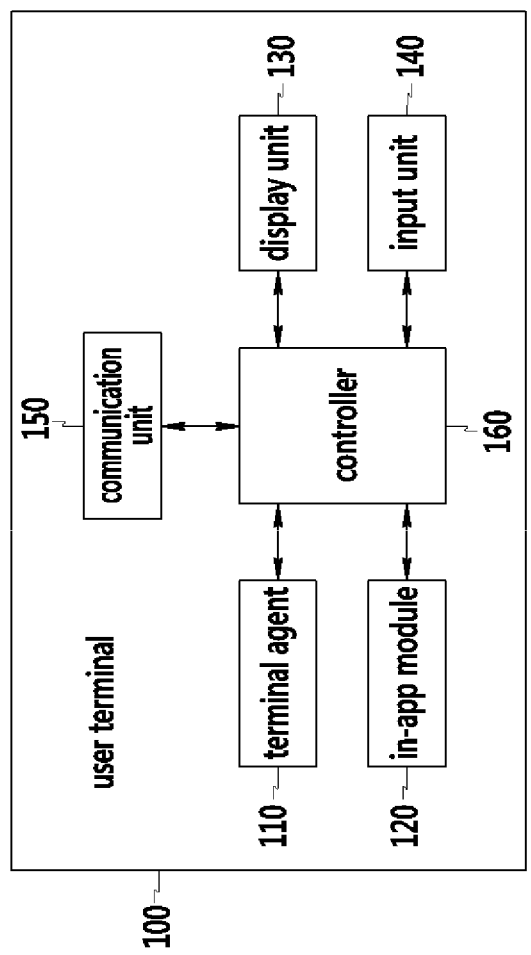
FIG. 2 is a block diagram illustrating a configuration of a user terminal according to an exemplary embodiment.

The user terminal 100 includes a configuration as illustrated in FIG. 2.

FIG. 2 is a block diagram illustrating a configuration of a user terminal according to an exemplary embodiment.

Referring to FIG. 2, the user terminal 100 includes a terminal agent 110, an in-app module 120, a display unit 130, an input unit 140, a communication unit 150, and a controller 160.

The terminal agent 110 is a software agent installed in an operating system of the user terminal 100 and locally executed, and is automatically installed when a particular application including the in-app module 120 is installed. The terminal agent 110 is automatically executed when the user terminal 100 is booted.

The terminal agent 110 operates as a user interface for requesting an in-app service. When a multimedia content purchasing request, a presenting request, or a sharing request is made, the terminal agent 110 executes the in-app module 120.

The in-app module 120 is illustrated as a separate component, but it is a component installed in a particular application. In this case, the in-app module 120 is provided in the form of an open API to application developers so as to be installed. The in-app module 120 may be configured as a functional block as illustrated in FIG. 3.

Figure 3:
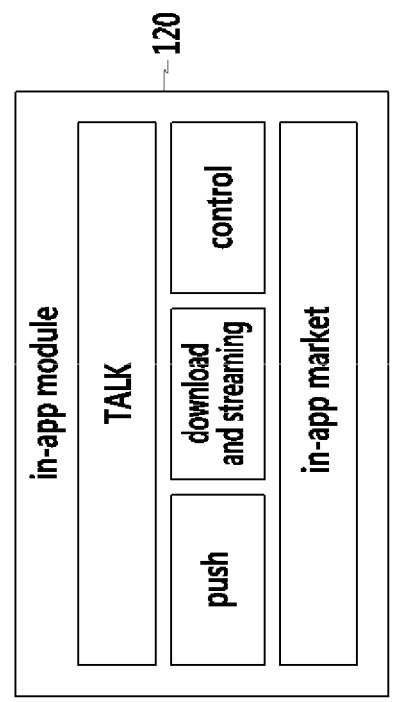
FIG. 3 is a functional block diagram of an in-app module according to an exemplary embodiment.

FIG. 3 is a functional block diagram of an in-app module according to an exemplary embodiment.

Referring to FIG. 3, the in-app module 120 includes a 'TALK' function, a 'push' function, a 'download and streaming' function, a 'control' function, and an 'in-app market'.

Here, the 'TALK' function provides a communication function between user terminals 100 having the in-app module 120 installed therein. According to the function, an environment in which a counterpart terminal having the in-app module 120 is registered by using an ID or a phone number may be provided.

The 'push' function pushes multimedia content stored in the user terminal 100 having the in-app module 120 installed therein to a different user terminal 100 also having an in-app module 120 installed therein.

The 'download and streaming' function may download and stream multimedia content from the in-app service server 300.

The 'control' function controls an in-app service of the in-app module 120, and it may confirm authority to execute multimedia content.

The 'in-app market' function may be connected to the in-app service server 300 to provide an interface environment allowing for a transaction of multimedia content.

Referring back to FIG. 2, the in-app module 120 may be executed according to a request from the terminal agent 110 and connected to the in-app service server 300 via the network 200 to perform a multimedia content purchase process, a present process (or a gift process), and a share process. Each of the processes will be described in detail with reference to the accompanying drawings.

The display unit 130 outputs various types of information according to operations of the user terminal 100 to a screen thereof.

The input unit 140 allows a user to input information or select information output to the display unit 130 therethrough.

The communication unit 150 is connected to the network 200 to provide a path for transmitting and receiving data.

The controller 160 refers to a component which performs a general operation of the user terminal 100 according to an operating system of the user terminal 100, and is connected to the terminal agent 110, the in-app module 120, the display unit 130, the input unit 140, and the communication unit 150 to control associated operations between the respective components.

In the above, only common components related to an in-app service, regardless of a type of the user terminal 100, are illustrated, and components according to types of terminals as to whether the user terminal 100 is a smart TV 101, a smartphone 103, or a tablet terminal 105 are omitted.

Exemplary embodiments of a screen provided by the user terminal 100 will be described with reference to FIGS. 4 and 5.

Figure 4:
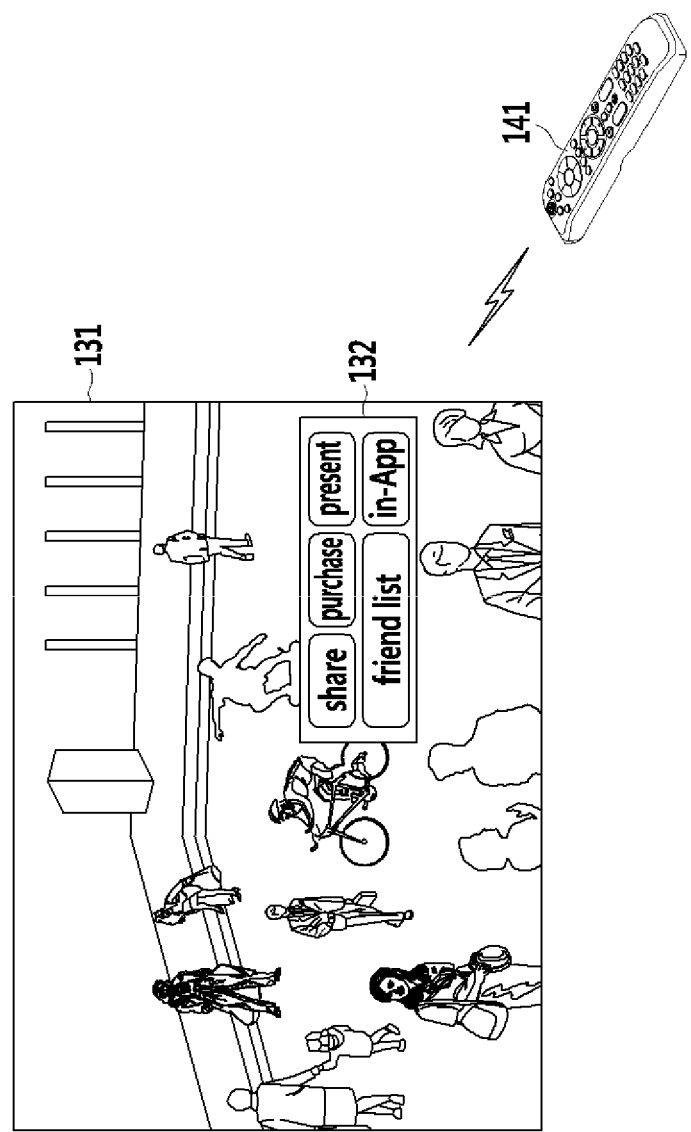
FIG. 4 is a view illustrating a screen of a smart TV according to an exemplary embodiment.

FIG. 4 is a view illustrating a screen of a smart TV according to an exemplary embodiment.

Referring to FIG. 4, when an in-app service request button defined in a remote controller 141 as an input unit of the smart TV 101 is selected, an in-app menu 132 is displayed on a TV screen 131.

The in-app menu 132 includes an item for sharing multimedia content being currently played (or reproduced), a purchase item, a present item, a friend list item, and an In-App item.

When the share item is selected, the multimedia content being currently played may be shared with a different user terminal 100.

When the purchase item is selected, the multimedia content being currently played may be purchased and downloaded to the smart TV 101 or a different terminal 100 owned by the user.

Also, when the present item is selected, the multimedia content being currently played may be purchased and transmitted to a terminal 100 of a different user. A present target may be a target included in the friend list.

When the friend list item is selected, a list of subscribers registered as friends to a social service of the user is displayed. Alternatively, a subscriber having the in-app module 120 may be registered as a friend in advance, and the friend list including the subscriber may be displayed. The user may chat with the subscriber included in the friend list.

When the In-App item is selected, the in-app service server 100 is connected, and a screen for transaction of multimedia contents provided by the in-app service server 300 may be output.

Figure 5:
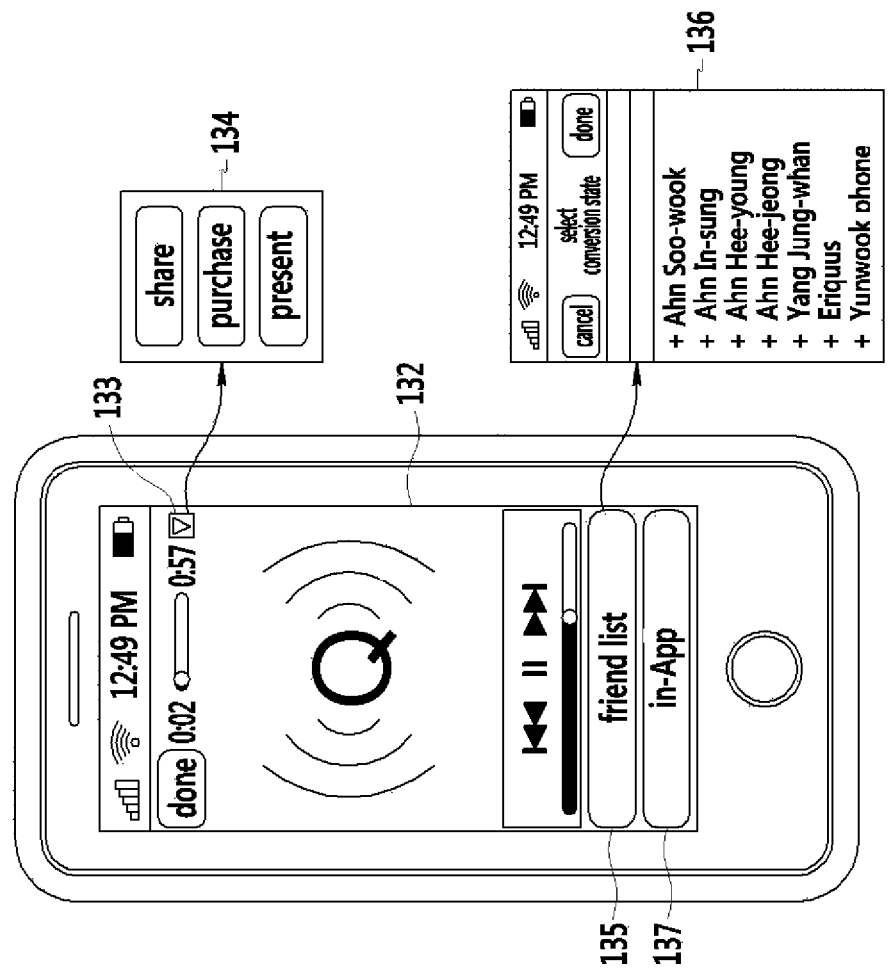
FIG. 5 is a view illustrating a screen of a smartphone according to an exemplary embodiment.

FIG. 5 is a view illustrating a screen of a smartphone according to an exemplary embodiment.

Referring to FIG. 5, the smartphone 103 may output in-app menus 133, 135, and 137 to a multimedia content play screen 132.

The in-app menus 133, 135, and 137 include a 'share, purchase, present' item 134, a friend list item 136, and an In-App item 137, and have functions identical to those described above with reference to FIG. 4, respectively, so a description thereof will be omitted.

The in-app service server 300 includes identical components to those of FIG. 3.

Figure 6:
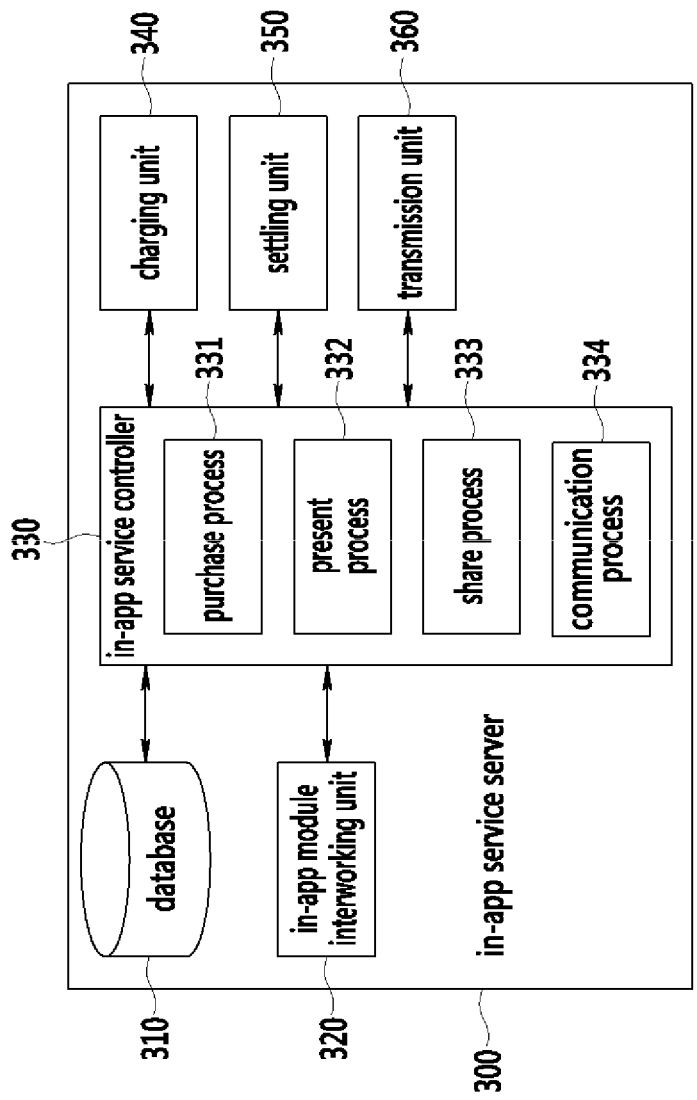
FIG. 6 is a block diagram illustrating a configuration of an in-app service server according to an exemplary embodiment.

FIG. 6 is a block diagram illustrating a configuration of the in-app service server according to an exemplary embodiment.

Referring to FIG. 6, the in-app service server 300 includes a database 310, an in-app module interworking unit 320, an in-app service controller 330, a charging unit 340, a settling unit 350, and a transmission unit 360.

The database 310 may store a terminal list including terminals owned by the subscriber of the particular user terminal 100 having the in-app module 120 of FIG. 2 installed therein. Also, the database 310 stores a friend list including friends of social services that the subscriber of the particular user terminal 100 having the in-app module 120 installed therein have joined. The social services may include, for example, Nate-On messenger, KaKao Talk, and the like, and the friend list may include information regarding subscribers registered as friends of the subscriber to each social service.

Also, the database 310 stores an online market use history or an in-app service use history. Such use history includes terminal information of a subscriber who has used an online market or an in-app service.

When the user terminal 100 is a TV, the database 310 may store identification information of the user terminal 100 as an ID and a password. When the user terminal 100 is a phone, the database 310 may store a phone number as identification information.

The in-app module interworking unit 320 is connected to the in-app module 120 of FIG. 2 according to a connection request from the in-app module 120. The in-app module interworking unit 320 may receive a multimedia content purchase request, a present request, and a share request from the in-app module 120 and deliver the same to the in-app service controller 330. The in-app service controller 330 receives data generated as a process is performed according to each request, from the in-app module interworking unit 320, and transmits the received data to the in-app module 120.

The in-app service controller 330 may interwork with the database 310 and the in-app module interworking unit 320 to perform a process according to a request from the in-app module 120. Here, the in-app service controller 330 performs a purchase process 331, a present process 332, a share process 333, and a communication process 334.

The purchase process 331 receives a multimedia content purchase request from the in-app module 120 and performs sequential operations to purchase multimedia content requested by the user. According to the purchase process 331, purchased multimedia content may be downloaded to the particular terminal 100 having the in-app module 120 installed therein, or multimedia content may be downloaded to a terminal selected by the user from a list of terminals of the user. Details thereof will be described with reference to FIG. 7, hereinbelow.

The present process 332 receives a multimedia content present request from the in-app module 120, and performs sequential operations to present multimedia content requested by the user. According to the present process 332, multimedia content is transmitted to a terminal of a friend selected by the user from a friend list of the user. Details thereof will be described in detail with reference to FIG. 8, hereinbelow.

The share process 333 receives a multimedia content share request from the in-app module 120, and performs sequential operations to share the multimedia content requested by the user. According to the share process 333, multimedia content is transmitted to a terminal selected by the user from the list of terminals of the user, or multimedia content is transmitted to a terminal of a friend selected by the user from the list of friends of the user. Details thereof will be described in detail with reference to FIG. 9, hereinbelow.

Here, the purchase process 331 and the present process 332 sets authority to use multimedia content, and in this case, the authority to use may be set to be identical to existing authority set according to content download.

The share process 333 may set authority to share multimedia content, and authority to share may include information specifying an execution terminal and an execution period.

The communication process 334 provides a friend list to the user terminal 100 in which the in-app module 120 is executed, and when a request for communication with the friend's terminal 100 selected from the friend list is received, the communication process 334 controls communication between the user terminals 100. For example, the communication process provides a friend list of FIG. 4 or 5, and provides a chatting service. In this case, the friend's terminal also needs to have the in-app module 120 installed therein.

The in-app service controller 350 may use an ID or a phone number as information for identifying the user terminal 100, and such identification information is stored in the database 310 in advance. In the case of the ID, an existing ID, for example an IPTV service ID or the like, rather than a separate ID for an in-app service, may be utilized.

That is, the in-app service controller 350 identifies a request terminal by using an ID or a phone number which was transmitted when the in-app module 120 of the user terminal 100 requested an in-app service. When the user terminal 100 is a TV, if the user wants to present multimedia content as a gift to the counterpart terminal 100 or wants to share multimedia content with the counterpart terminal 100, the user may input an ID of the counterpart terminal 100 to request 'presenting a gift' or request 'sharing a gift'.

The charging unit 340 performs a charging process according to purchase of multimedia content according to the purchase process 331 and the present process 332 of the in-app service controller 330.

The settling unit 350 performs a payment and billing process according to a purchase of multimedia content according to the purchase process 331 and the present process 332 of the in-app service controller 330. The settling unit 350 may include a process of various settling means such as mobile payment, credit card payment, account transfer payment, e-money payment, and the like.

The transmission unit 360 transmits multimedia content to a purchase target terminal according to the purchase process 331 of the in-app service controller 330, a present target terminal according to the present process 332, and a share target terminal according to the share process 333.

Here, the purchase target terminal, the present target terminal, and the share target terminal are included in the user terminal 100 of FIG. 1.

Hereinafter, a method for providing an in-app service on the basis of the foregoing contents will be described.

Here, an in-app service includes a purchase process, a present process, a share process, and a communication process, and each process will be described in association with the configurations of FIGS. 1 through 6. The same reference numerals are used throughout.

Figure 7:
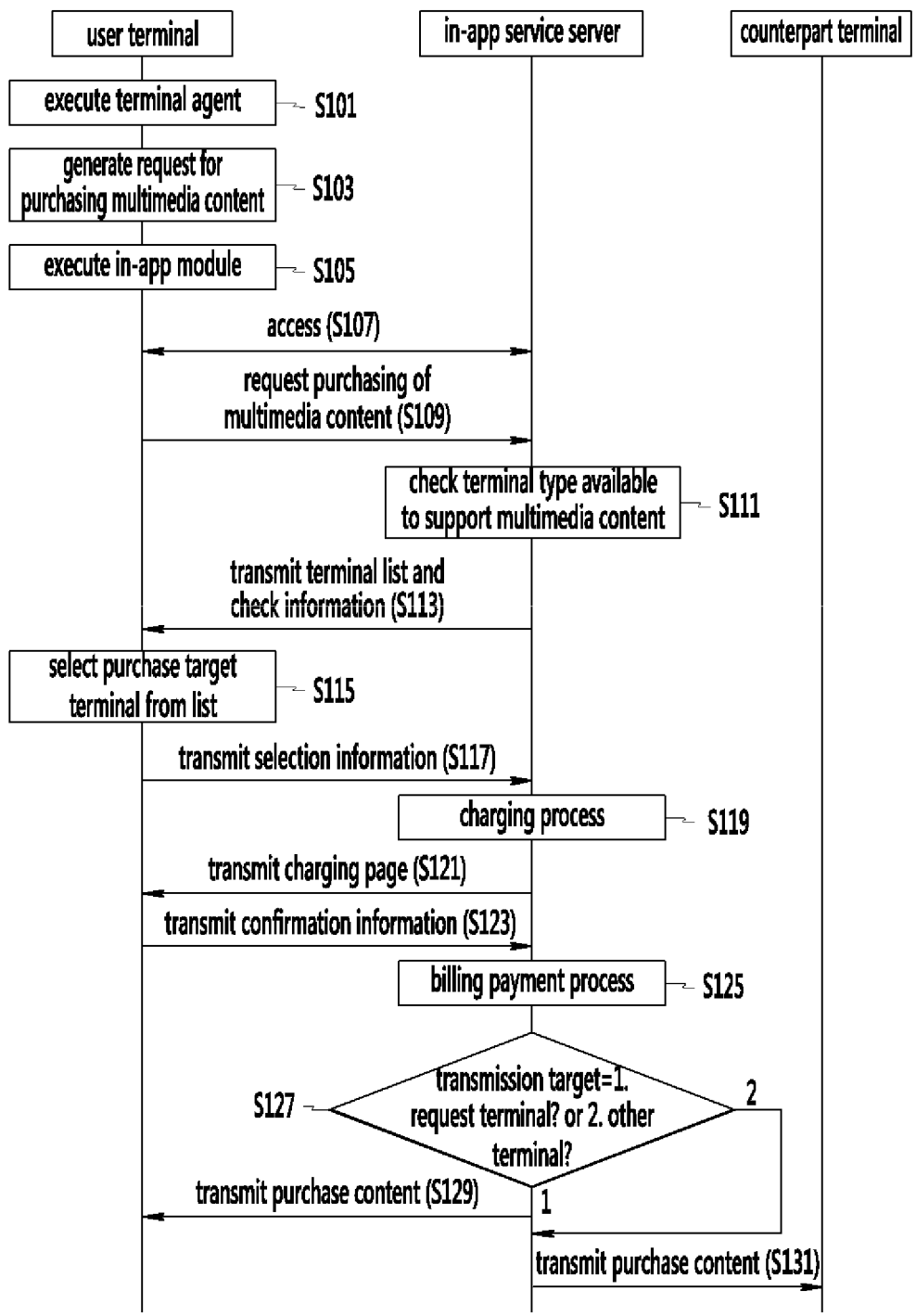
FIG. 7 is a flowchart illustrating a purchase process according to an exemplary embodiment.

FIG. 7 is a flowchart illustrating the purchase process according to an exemplary embodiment.

Referring to FIG. 7, a first terminal refers to the user terminal 100 that requests a purchase, and a second terminal refers to a different terminal 100 of the user which is to download purchased multimedia content.

In a state in which the first terminal 100 executes the terminal agent 110 (S101), when a multimedia content purchase request is made (S103), the terminal agent 110 executes the in-app module 120 (S105). Operation S103 may be performed when the user selects a purchase item from the in-app menu of FIG. 4 or 5.

The in-app module 120 accesses the in-app module interworking unit 320 of the in-app service server 300 to request multimedia content purchase (S109).

The multimedia content may be multimedia content being executed in the first terminal 100. In this case, when the in-app module 120 receives information regarding the multimedia content from the in-app service server 300 and outputs the received information to the screen and the user selects purchase, operation S109 may be performed.

Meanwhile, the purchase process 331 of the in-app service server 300 checks a type of terminal able to support the multimedia content requested to be purchased (S111). Since the database 310 of the in-app service server 300 has information regarding types of terminals able to support respective types of multimedia content stored in advance therein, the purchase process 331 may search the database 310 to check a type of terminal capable of supporting the multimedia content requested to be purchased.

Then, the purchase process 331 obtains the list of terminals owned by the subscriber of the first terminal 100 from the database 310, and provides the obtained terminal list together with the information checked in operation S111 to the first terminal 100 (S113). Whether each terminal supports multimedia content may be indicated in the terminal list according to the information checked in operation S111.

The in-app module 120 of the first terminal 100 transmits information regarding the purchase target terminal selected (S115) by the user from the terminal list received in operation S113 to the in-service server 300 (S117). In this case, the purchase target terminal may be the first terminal 100.

Then, the charging unit 340 of the in-app service server 300 performs a charging process (S119) and transmits a charging page including charge information of multimedia content to the first terminal 100 (S121). When information indicating that the charge is acceptable is received from the first terminal 100 (S123), the settling unit 350 of the in-app service server 300 performs a billing payment process (S125).

When the billing payment process is completed, the transmission unit 360 of the in-app service server 300 determines whether a transmission target is the first terminal 100 or a different terminal, i.e., the second terminal 100, owned by the subscriber of the first terminal 100 according to selection information received in step S117 (S127).

According to determination in operation S127, the transmission unit 360 transmits purchased content to the first terminal 100 (S129) or to the second terminal 100 (S131).

The transmission unit 360 may transmit a multimedia content file itself in operation S129 or S131. Alternatively, the transmission unit 360 may transmit a message including a download path of the multimedia content file, for example, a callback URL message, or the like.

According to the exemplary embodiment of FIG. 7 as described above, the user may purchase music content and transmit the same to his or her phone, while viewing a music broadcast on a TV.

Figure 8:
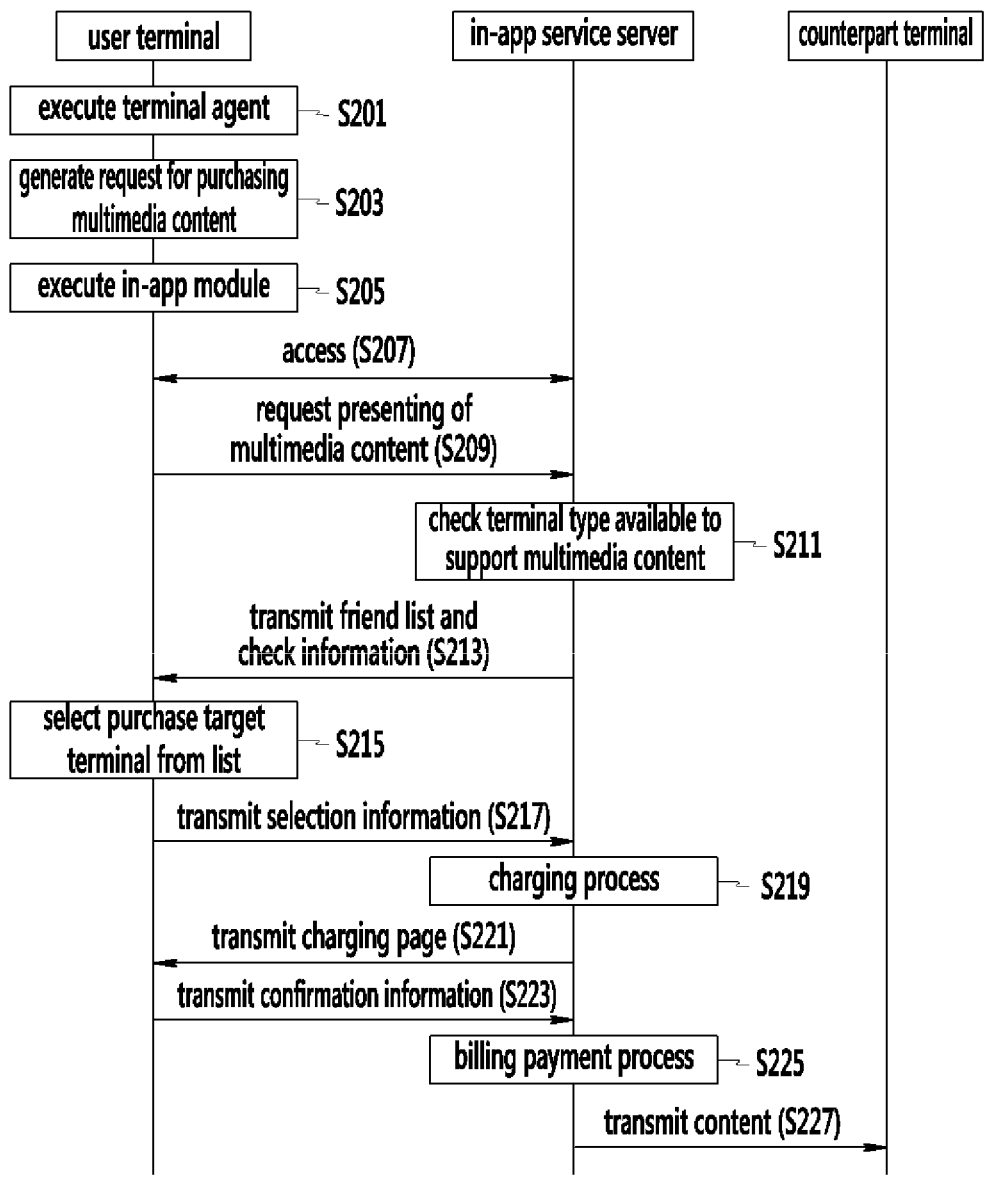
FIG. 8 is a flowchart illustrating a process for presenting a gift according to an exemplary embodiment.

FIG. 8 is a flowchart illustrating a process for presenting a gift according to an exemplary embodiment.

Referring to FIG. 8, the user terminal 100 is a terminal that requests presenting multimedia content as a gift, a counterpart terminal is a target terminal 100 that receives the multimedia content as a gift, and the user terminal 100 and the counterpart terminal 100 have the in-app module installed therein, respectively.

In a state in which the user terminal 100 executes the terminal agent 110 (S201), when a request for presenting multimedia content is made (S203), the terminal agent 110 executes the in-app module 120 (S205). In this case, operation S203 may be performed when the user selects the present item from the in-app menu of FIG. 4 or 5.

The in-app module 120 may access the in-app module interworking unit 320 of the in-app service server 300 (S207) and request presenting of multimedia content (S209).

The multimedia content may be multimedia content being executed in the user terminal 100. In this case, when the in-app module 120 receives the multimedia content information from the in-app service server 300 and outputs it to the screen, and the user selects presenting, operation S209 may be performed.

Meanwhile, the present process 332 of the in-app service server 300 checks a terminal type that can support the multimedia content requested to be presented (S211). In this case, the database 310 of the in-app service server 300 has information regarding types of terminals able to support respective types of multimedia content stored in advance therein, the present process 332 may search the database 310 to check a type of terminal capable of supporting the multimedia content requested to be presented.

The present process 332 then obtains the friend list including a list of friends of social services that the subscriber of the first terminal 100 has joined and a list of subscribers registered as friends from the database 310 through the in-app module 120, and provides the same together with the information checked in operation S211 to the user terminal 100 (S213). Here, whether each friend supports multimedia content may be indicated in the friend list according to the information checked in operation S211.

The in-app module 120 of the user terminal 200 transmits information regarding a target terminal selected (S215) by the user from the terminal list received in operation S213, to the in-app service server 300 (S217).

Then, the charging unit 340 of the in-app service server 300 performs the charging process (S219) and transmits a charging page including charging information of multimedia content to the user terminal 100 (S221). When information indicating that a charge is acceptable and is received from the user terminal 100 (S223), the settling unit 350 of the in-app service server 300 performs a billing payment process (S125).

When the billing payment process is completed, the transmission unit 360 of the in-app service server 300 transmits present content to the second terminal 100 according to selection information received in operation S217 (S227).

In this case, the transmission unit 360 may transmit a multimedia content file itself. Alternatively, the transmission unit 360 may transmit a message including a download path of the multimedia content file, for example, a callback URL message, or the like.

According to the exemplary embodiment of FIG. 8 as described above, a user A, while viewing a magazine (application) with an IPad, may present an E-book as a gift to an IPad of a user B upon viewing an article related to the E-book. Alternatively, the user A may purchase a movie in a TV and transmit (present) it to the TV of the user B.

Figure 9:
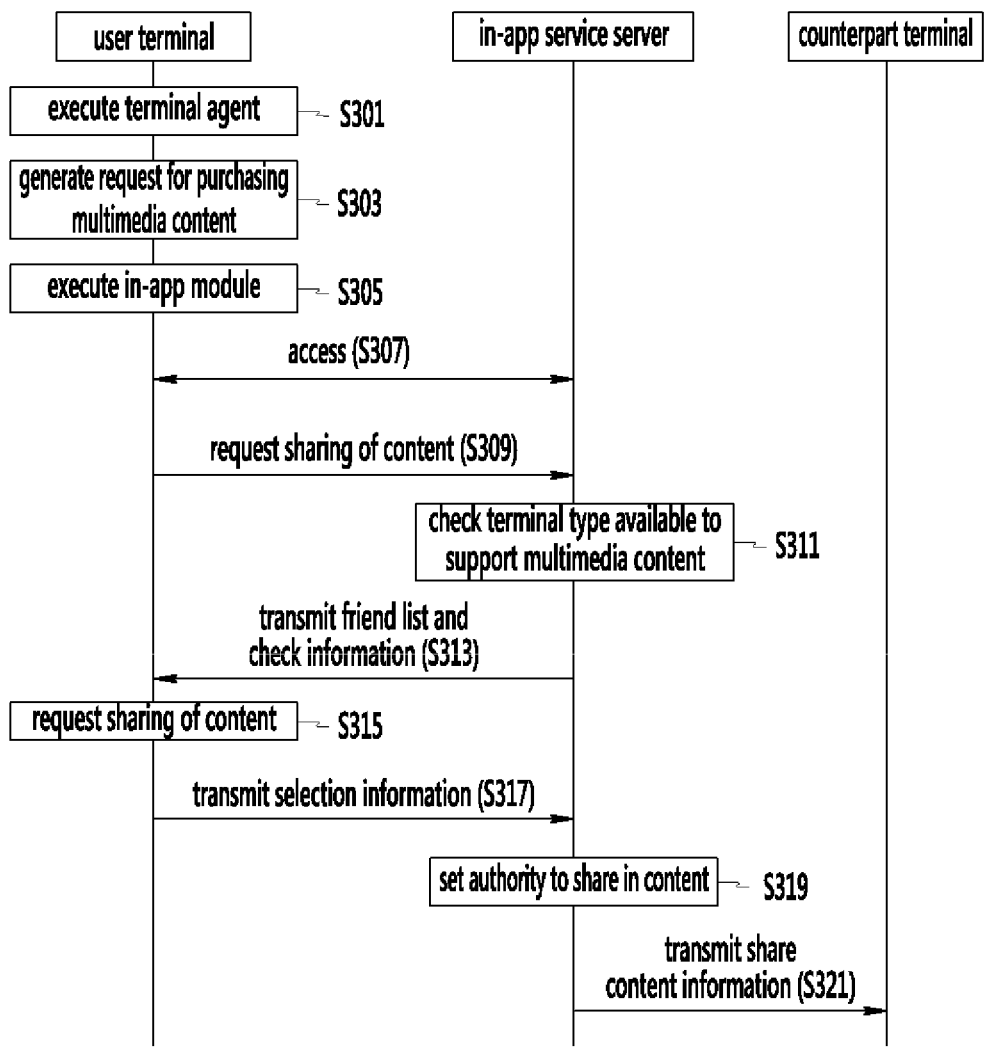
FIG. 9 is a flowchart illustrating a share process according to an exemplary embodiment.

FIG. 9 is a flowchart illustrating a share process according to an exemplary embodiment.

Referring to FIG. 9, the user terminal 100 is a terminal that requests sharing multimedia content, a counterpart terminal is a target terminal 100 to share the multimedia content with as a gift, and the user terminal 100 and the counterpart terminal 100 have the in-app module installed therein, respectively.

In a state in which the user terminal 100 executes the terminal agent 110 (S301), when a request for sharing multimedia content is made (S303), the terminal agent 110 executes the in-app module 120 (S305). In this case, operation S303 may be performed when the user selects the share item from the in-app menu of FIG. 4 or 5.

The in-app module 120 may access the in-app module interworking unit 320 of the in-app service server 300 (S307) and request sharing of multimedia content (S309). In this case, share target multimedia content stored in the user terminal 100 may be transmitted to the in-app service server 300.

Meanwhile, the share process 333 of the in-app service server 300 checks a terminal type that can support the multimedia content requested to be shared (S311). In this case, the database 310 of the in-app service server 300 has information regarding types of terminals able to support respective types of multimedia content stored in advance therein, the share process 333 may search the database 310 to check a type of terminal capable of supporting the multimedia content requested to be shared.

Then, the share process 333 obtains the friend list including a list of friends of social services that the subscriber of the user terminal 100 has joined and a list of subscribers registered as friends from the database 310 through the in-app module 120, and provides the same together with the information checked in operation S311 to the user terminal 100 (S313). Whether each friend supports multimedia content may be indicated in the friend list according to the information checked in operation S311.

The in-app module 120 of the user terminal 200 transmits information regarding a share target terminal selected (S315) by the user from the terminal list received in operation S313 to the in-app service server 300 (S317).

Then, the share process 333 of the in-app service server 300 sets authority to share multimedia content (S319). In this case, the authority to share may be set such that reproducing is available only during a particular period of time according to a policy previously set in the in-app service server 300. The policy follows prior consultation with a multimedia content copyright holder or a distributor.

The transmission unit 360 of the in-app service server 300 transmits the multimedia content for which the authority to share is set in operation S319 to the second terminal 100 (S321).

In this case, the transmission unit 360 may transmit a multimedia content file itself. Alternatively, the transmission unit 360 may transmit a message including a download path of the multimedia content file, for example, a callback URL message, or the like.

According to the exemplary embodiment of FIG. 9 as described above, the user A, while enjoying a show on a phone, may transmit a relevant image to a TV of the user B and view the same together.

Figure 10:
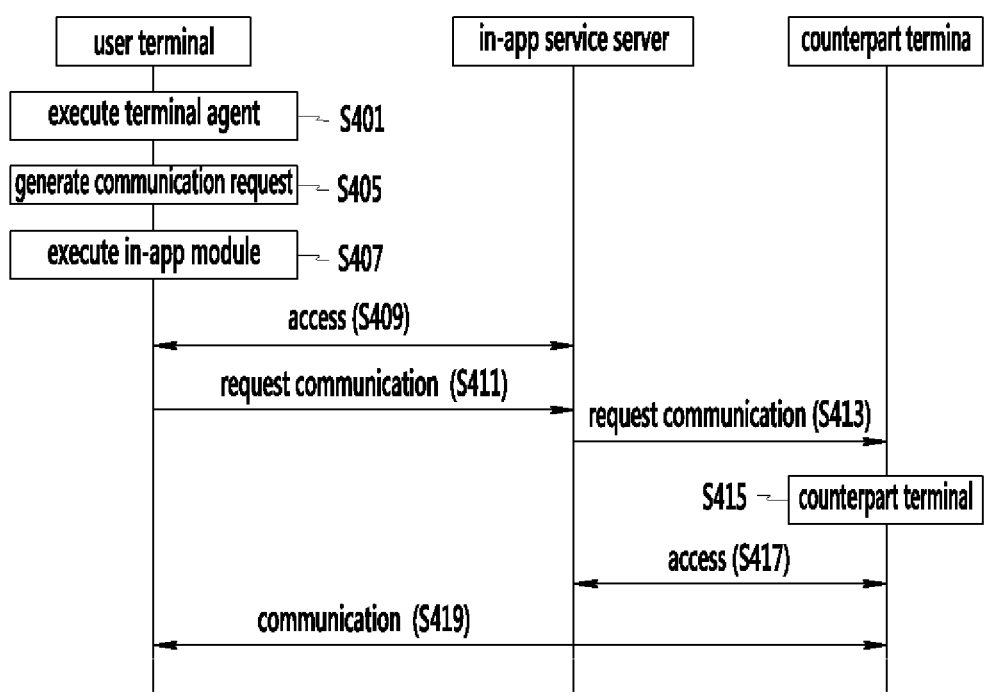
FIG. 10 is a flowchart illustrating a communication process according to an exemplary embodiment.

FIG. 10 is a flowchart illustrating a communication process according to an exemplary embodiment.

Referring to FIG. 10, both the user terminal 100 and the counterpart terminal 100 need to have the in-app module 120 installed therein, respectively.

Here, the terminal agent 110 is executed in both the user terminal 100 and the counterpart terminal 100 (S401).

In this case, when a communication request is made (S405), the terminal agent 110 executes the in-app module 120 (S407). Operation S405 may be performed when the user selects the friend list item from the in-app menu of FIG. 4 or 5, selects a friend from the friend list, and requests chatting.

The in-app module 120 then accesses the in-app module interworking unit 320 of the in-app service server 300 (S409) and requests communication (S411).

Subsequently, the communication process 334 of the in-app service server 300 requests communication from the counterpart terminal 100 requested for communication (S413).

Then, the terminal agent 110 of the counterpart terminal 100 executes the in-app module 120 (S415) to access the in-app service server 300 (S417).

Thereafter, the user terminal 100 and the counterpart terminal 100 perform communication under the control of the communication process 334 of the in-app service server 300 (S419).

Here, communication includes a chatting service.

While performing communication of FIG. 10, the multimedia content presenting and share processes described above with reference to FIGS. 8 and 9 may be further performed.

According to the exemplary embodiment of FIG. 10, the user A and the user B may present or share multimedia content such as movies or games to or with each other during communication through in-app chatting of a TV and an IPad.

Figure 11:
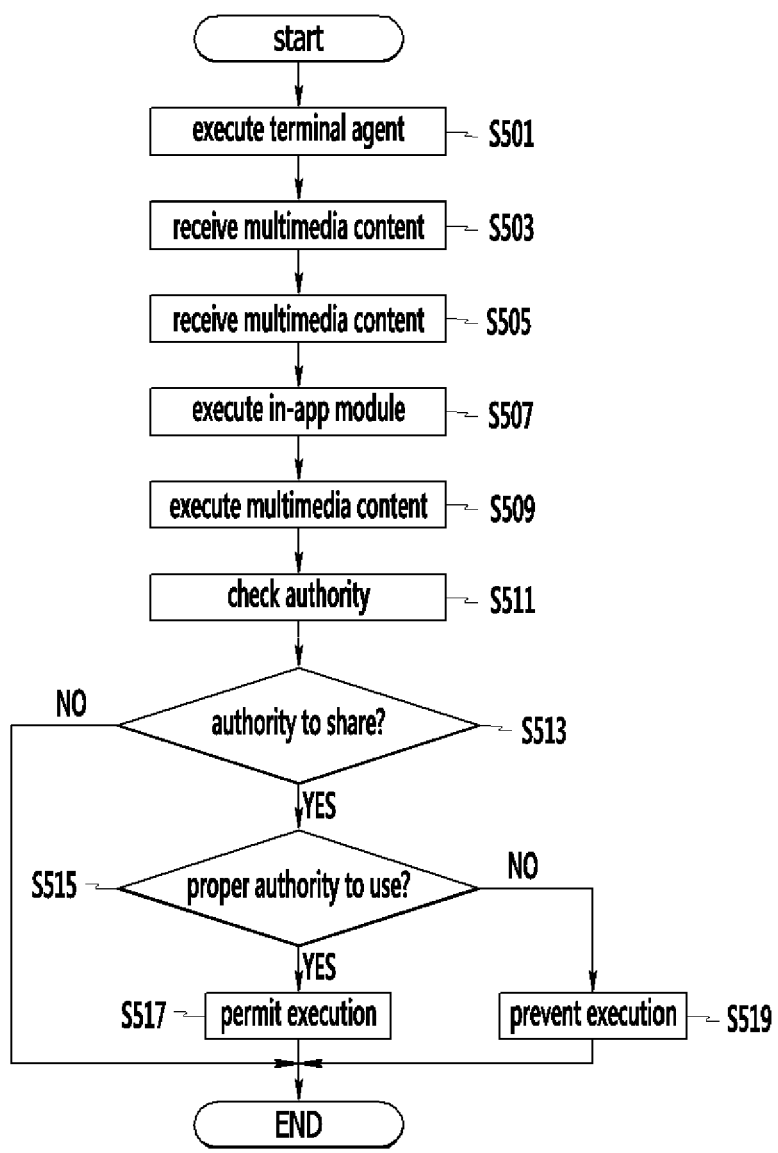
FIG. 11 is a flowchart illustrating an operation of a user terminal according to an exemplary embodiment.

FIG. 11 is a flowchart illustrating an operation of a user terminal according to an exemplary embodiment of the present invention. FIG. 11 illustrates an operation of a target terminal that downloads and shares multimedia content.

Referring to FIG. 11, in a state in which the terminal agent 110 of the user terminal 100 is executed (S501), when multimedia content is received (S503), the terminal agent 110 executes the in-app module 120 (S505). In operation 5503, the multimedia content itself may be received from the in-app service server 300, or a content server (not shown) may be accessed according to a download path received from the in-app service server 300 to download the multimedia content.

In this case, when the multimedia content received in operation 5503 is executed (S507), the in-app module 120 may check authority (S509).

The in-app module 120 determines whether it has authority to share (S511), and when it is determined to have authority to share, the in-app module 120 determines whether the authority to share is proper (S513). That is, whether an execution term set in the authority to share has expired may be determined.

In this case, when the authority to share is determined to be proper, the in-app module 120 may permit execution (S517) after a determination is made as to whether there is proper authorization (S515), and when the authority to share is determined to not be proper, the in-app module 120 stops execution (END). Execution may also be prevented (S519) if there is no determination of authorization (S515).

While exemplary embodiments have been described, it is to be understood that the invention is not limited to the disclosed exemplary embodiments, but, on the contrary, is intended to cover various modifications and equivalent arrangements included within the spirit and scope of the appended claims.

The invention claimed is:

1. A user terminal comprising:
a hardware processor; and
a memory storing computer executable instructions configured to cause the hardware processor to implement:
an in-app module configured to be connected to an in-app service server providing an in-app service, which allows for at least one from among purchasing multimedia content, sharing multimedia content between different users, and presenting multimedia content between different users, and configured to transmit a multimedia content purchase request, a present request, and a share request to the in-app service server; and
a terminal agent of the user terminal, the terminal agent operating as a user interface for requesting the in-app service,
wherein the in-app module is further configured to transmit a request to the in-app service server, the request requesting transmission of at least one of the multimedia content and a link to the multimedia content to a second user terminal in response to a purchase of the multimedia content by the user terminal, and
wherein the in-app module is further configured to transmit the request to the in-app service server before the purchase and in response to confirmation that the second user terminal is configured to support the at least one of the multimedia content.

2. The user terminal of claim 1, wherein the in-app module is installed as a component in a particular application.

3. The user terminal of claim 1, wherein the in-app module of the user terminal performs communication with an in-app module installed in the second user terminal through the in-app service server.

4. The user terminal of claim 1, further comprising:
a display configured to output onto a screen of the display in-app menus for requesting sharing, purchasing, and presenting multimedia content; and
a user interface configured to receive user input;
wherein, when a request is selected from the in-app menus via the user interface, the terminal agent executes the in-app module.

5. The user terminal of claim 4, wherein when a multimedia content purchase request is selected from the in-app menus, the in-app module requests purchasing of multimedia content from the in-app service server, receives information regarding the second user terminal that is able to support the multimedia content, and requests transmission of the multimedia content to the second user terminal selected by the user desiring to purchase the multimedia content among supportable terminal types, the information regarding the second user terminal including information regarding a terminal type that is able to support multimedia content and a list of terminals owned by a subscriber of the user terminal.

6. The user terminal of claim 4, wherein when a multimedia content present request is selected from the in-app menus, the in-app module requests presenting of multimedia content from the in-app service server, receives information regarding the second user terminal that is able to support the multimedia content, and requests transmission of the multimedia content to the second user terminal selected by the user among supportable terminal types, the information regarding the second user terminal including information regarding a terminal type that is able to support multimedia content and a list of friends of a subscriber of the user terminal.

7. The user terminal of claim 4, wherein when a multimedia content share request is selected from the in-app menus, the in-app module requests sharing of multimedia content from the in-app service server, receives information regarding the second user terminal that is able to support the multimedia content, and requests transmission of the multimedia content to the second user terminal selected by the user among supportable terminal types, the information regarding the second user terminal including information regarding a terminal type that is able to support multimedia content and a list of friends of a subscriber of the user terminal.

8. The user terminal of claim 1, further comprising:
a display configured to output onto a screen of the display an in-app menu for requesting chatting with at least one friend selected from among a list of friends,
wherein, when chatting with said at least one friend is selected from the list, the in-app module requests communication from the in-app service server and interworks with an in-app module installed in the second user terminal of the friend to implement a chatting service.

9. The user terminal of claim 8, wherein the in-app module registers a counterpart terminal having the in-app module installed therein as a friend by using an ID or a phone number.

10. The user terminal of claim 1, wherein
when multimedia content is received from the in-app service server, the terminal agent executes the in-app module, and
when execution of the received multimedia content is requested, the in-app module checks authority information of the multimedia content, and when authority to share has been set, the in-app module determines whether to execute the multimedia content by determining whether the execution request is proper according to the authority to share.

11. The user terminal of claim 1, wherein:
the first user terminal is a mobile terminal; and
the second user terminal is a television configured to display the multimedia content in response to receiving the multimedia content from the in-app service server.

12. The user terminal of claim 1, wherein
the in-app module is further configured to receive a user selection of the second user terminal and to transmit the user selection to the in-app service server as part of the request.

13. The user terminal of claim 12, wherein
the in-app module is further configured to transmit a purchase request requesting the purchase of the multimedia content to the in-app service server,
the in-app module is further configured to receive a terminal list from the in-app service server in response to the purchase request, the terminal list comprising at least the second user terminal, and
the in-app module is further configured to receive the user selection of the second user terminal as a selection from a display of the terminal list.

14. The user terminal of claim 1, wherein the at least one hardware processor is further configured to control displaying of an interface of the in-app module overlaid on a display of the multimedia content, and
wherein the interface comprises a first icon corresponding to providing an option to purchase multimedia content, a second icon corresponding to providing an option to share multimedia content between different users, a third icon corresponding to providing an option to output multimedia content to a different user, and a fourth icon corresponding to providing an option to view a friend list.

15. An in-app service server connected to a plurality of user terminals, the in-app service server comprising:
a hardware processor; and
a memory storing computer executable instructions configured to cause the hardware processor to implement:
an in-app module interworking unit configured to be connected to an in-app module of at least one of the plurality of user terminals and to transmit and receive data for the in-app service, the in-app service being a service allowing the at least one of the plurality of user terminals to purchase, share, and present multimedia content; and
a service controller configured to implement the in-app service when the in-app service is requested by the at least one of the plurality of user terminals through the in-app module interworking unit,
wherein the in-app module interworking unit is further configured to transmit at least one of the multimedia content and a link to the multimedia content to a first terminal from among the user terminals in response to a second terminal from among the user terminals purchasing the multimedia content, and
wherein the in-app module interworking unit is further configured to receive a request from the second user terminal to transmit the at least one of the multimedia content to the first user terminal, and to receive the request before the second user terminal purchases the multimedia content and in response to confirmation that the first user terminal is configured to support the at least one of the multimedia content.

16. The in-app service server of claim 15, further comprising
a database configured to store a terminal list including terminals owned by a subscriber of each of the user terminals having the in-app module installed therein, a friend list including friends of social services that the subscriber uses, and information regarding terminal types able to support multimedia content,
wherein the service controller provides:
a purchase process configured to, when a multimedia content purchase request is received from a user terminal, transmit the multimedia content to the user terminal or to a terminal selected by a user from the terminal list;
a present process configured to, when a multimedia content present request is received from the user terminal, transmit the multimedia content to a terminal of a friend selected by the user from the friend list; and
a share process configured to, when a multimedia content share request is received from the user terminal, set share authority in the multimedia content and transmit the same to the terminal of the friend selected by the user from the friend list.

17. The in-app service server of claim 16, wherein the purchase process, the present process, and the share process relate to checking information regarding a terminal type able to support the requested multimedia content from a database, and provide the requested multimedia content to the user terminal.

18. The in-app service server of claim 16, further comprising:
a charging unit configured to charge for the multimedia content; and
a settling unit configured to perform billing and payment with respect to the multimedia content,
wherein the purchase process and the present process interwork with the charging unit and the settling unit to provide a billing page of the multimedia content to the user terminal, and when confirmation of the charge is received, the purchase process and the present process perform payment on the multimedia content and transmit the multimedia content.

19. The in-app service server of claim 16, further comprising
a transmission unit configured to transmit one from among the multimedia content and information regarding a download path of the multimedia content.

20. The in-app service server of claim 16, wherein the service controller further provides:
a communication process transmitting, when a request for chatting with a different user terminal having an in-app module installed therein is received from the user terminal, a chatting request to the different user terminal to activate the in-app module of the different user terminal, and supporting communication between the in-app modules.

21. The in-app service server of claim 20, wherein the service controller uses an ID or a phone number as identification information of the user terminal.

22. A method of receiving an in-app service, the method comprising:
connecting a first user terminal to an in-app service server;
transmitting a request from the first user terminal to the in-app service server, the request comprising at least one from among a purchase request, a present request, and a share request to the in-app service server; and in a case in which the request requests transmission of the in-app service to a second user terminal in response to the first user terminal purchasing the in-app server, receiving the in-app service at a second user terminal in response to the first user terminal purchasing the in-app service, wherein the request is transmitted before the purchase and in response to confirmation that the second user terminal is configured to support a multimedia content.

23. A system for providing an in-app service, the system comprising: a user terminal and an in-app service server, the user terminal comprising:

a first hardware processor; and a first memory storing computer executable instructions configured to cause the first hardware processor to implement:

an in-app module configured to be connected to an in-app service server providing an in-app service, which allows for at least one from among purchasing multimedia content, sharing multimedia content between different users, and presenting multimedia content between different users, and configured to transmit a multimedia content purchase request, a present request, and a share request to the in-app service server; and a terminal agent of the user terminal, the terminal agent operating as a user interface for requesting the in-app service; and the in-app service server comprising:

a second hardware processor; and a second memory comprising computer executable instructions configured to cause the second hardware processor to implement:

an in-app module interworking unit connected to an in-app module for an in-app service, the in-app module being previously installed in at least one of a plurality of user terminals to transmit and receive data for the in-app service, the in-app service being a service allowing the at least one of the plurality of user terminals to purchase, share, and present multimedia content; and a service controller configured to implement the in-app service when the in-app service is requested by the at least one of the plurality of user terminals through the in-app module interworking unit, wherein the in-app module interworking unit is further configured to transmit at least one of the multimedia content and a link to the multimedia content to a first of the user terminals in response to another of the user terminals purchasing the multimedia content, and wherein the in-app module interworking unit is further configured to receive a request from the another of the user terminals to transmit the at least one of the multimedia content to the first of the user terminals, and to receive the request before the second user terminal purchases the multimedia content and in response to confirmation that the first of the user terminals is configured to support the at least one of the multimedia content.

* * * * *